(12) United States Patent
Griffin

(10) Patent No.: US 6,758,249 B2
(45) Date of Patent: Jul. 6, 2004

(54) GROOVED TIRE SUPPORT RING

(75) Inventor: David Allen Griffin, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 46 days.

(21) Appl. No.: 10/315,378

(22) Filed: Dec. 6, 2002

(65) Prior Publication Data
US 2004/0108033 A1 Jun. 10, 2004

(51) Int. Cl.[7] ............... B60C 17/04; B60C 17/06; B60C 17/10
(52) U.S. Cl. ............... 152/158; 152/520; 152/522
(58) Field of Search .................. 152/158, 520, 152/522

(56) References Cited

U.S. PATENT DOCUMENTS

| 4,676,288 A | * | 6/1987 | Zinnen ............... 152/158 |
| 4,823,854 A | * | 4/1989 | Payne et al. ........... 152/158 X |
| 5,891,279 A |   | 4/1999 | Lacour ................ 152/520 |

* cited by examiner

Primary Examiner—Adrienne C. Johnstone
(74) Attorney, Agent, or Firm—Nancy T. Krawczyk

(57) ABSTRACT

A support ring for a tire is disclosed. The support ring is to be mounted on a tire wheel for support of the underside of the tire when the tire is operated at underinflated conditions. The outer surface of the support ring is provided with a set of grooves that permit lubrication to freely travel over the surface of the ring during use.

9 Claims, 2 Drawing Sheets

GROOVED TIRE SUPPORT RING

FIELD OF THE INVENTION

The present invention relates to support rings for vehicle tires, which are mounted inside the tires on the wheel rim in order to take up the vehicle load in the event of reduced tire pressure. In particular, the support ring has a particular groove pattern on the outer surface for the purpose of distributing any lubricating fluids and for dissipating any heat build-up.

BACKGROUND OF THE INVENTION

Tires are primarily supported by internal air pressure. A number of tire designs now exist that use a support ring located inside the tire to support the tire when the tire is operated in an underinflated condition. The use of a support ring of annular shape made of a flexible elastomeric material has been known for a long time. To improve the endurance performance of the support, a lubricant is generally included inside the tire cavity in order to lubricate any contact there may be between the outer surface of the ring and the inside of the tire.

One such support ring is disclosed in U.S. Pat. No. 5,891,279. The ring has a set of longitudinal grooves formed on the outer surface of the ring. Any lubricant in the tire cavity wilt remain in the grooves during rotation of the tire, and does not have the means to travel across the ring surface.

Other rings have employed the use of holes extending completely through the support ring. Such designs might be good for heat dissipation, but are not satisfactory for keeping lubricant on the outermost surface of the ring.

SUMMARY OF THE INVENTION

The present invention is aimed at meeting the goals of allowing the lubricant to travel across the surface of the ring and having sufficient grooving for good heat dissipation.

Disclosed is a support ring intended to be mounted on a wheel rim inside a tire equipping a vehicle, in order to support the tread strip of the tire in the event of an underinflated condition of the tire. The support has a base intended to fit around the wheel rim, a cap, and an annular body connecting the base and the cap. In accordance with the invention, the cap has at least one circumferential groove and a plurality of lateral grooves resulting in a net-to-gross ratio in the range of 75 to 90%.

In one aspect of the disclosed invention, the cap has a centrally located circumferential groove, the groove having sloping rounded walls and a width of 15 to 35% of the width of the cap.

In another aspect of the invention, the lateral grooves decrease in depth as the grooves approach the lateral edge of the cap.

In another aspect of the invention, some of the plurality of lateral grooves extend to the edge of the cap and some of the plurality of lateral grooves do not extend to the edge of the cap.

In another aspect of the invention, the cap has a centrally located circumferential groove dividing the cap into two cap halves. The lateral grooves are located in each cap half. Some of the lateral grooves may extend to the edge of the cap while some of the plurality of lateral grooves do not extend to the edge of the cap. Additionally, the lateral grooves may be curved and the grooves in each cap half may be curved in the same or opposing directions.

In another aspect of the invention, the cap may have further circumferential grooves on each side of the centrally located circumferential groove.

BRIEF DESCRIPTION OF THE DRAWINGS

The invention will be described by way of example and with reference to the accompanying drawings in which.

DETAILED DESCRIPTION OF THE INVENTION

Figure 1:
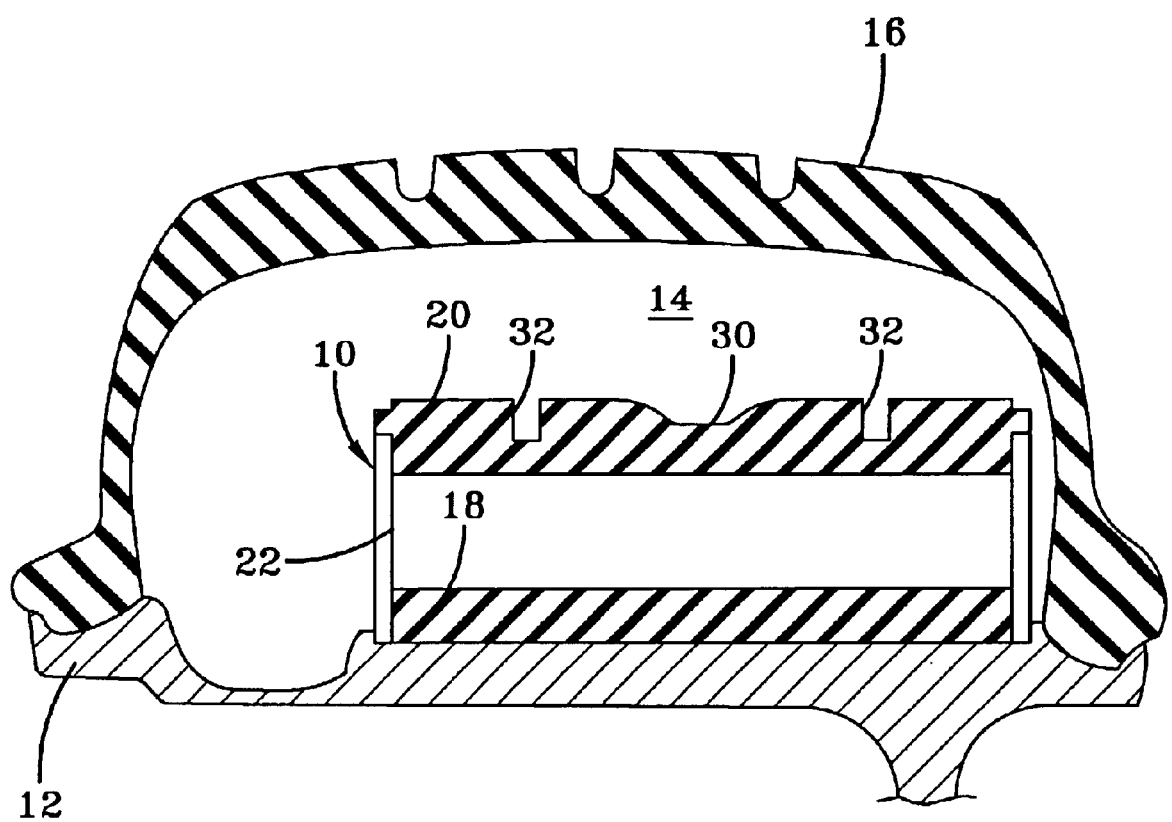
FIG. 1 illustrates a tire, wheel, and internal support ring.

FIG. 1 illustrates a support ring 10 according to the invention mounted around a preferential wheel rim 12 and inside the cavity 14 of a corresponding tire 16.

The support ring is illustrated as being mounted inside of an asymmetrical tire 16 on an asymmetrical wheel rim 12. However, for the purpose of this invention, the tire and wheel construction may vary from that illustrated to other types of tire and wheel construction and the present invention is not limited to the illustrated tire 16 and wheel 12.

The support ring 10 has three main parts: a base 18 of annular overall shape which may or may not be reinforced, a substantially annular cap 20 with grooves in accordance with the present invention, and an annular body 22 for joining the base 18 and the cap 20 together. The annular body 22 may have any configuration desired to achieve a particular set of design characteristics. The annular body may be a series of repeating arches, as disclosed in commonly owned and assigned U.S. patent application Ser. No. 10/133,666, filed on Apr. 26, 2002, which is fully incorporated herein by reference thereto.

Figure 2:
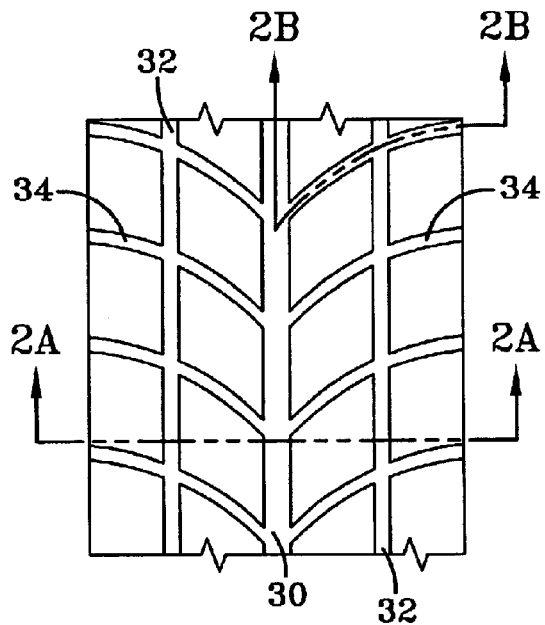
FIG. 2 is an overhead view of the cap of the support ring.

FIG. 2 is a sectional top view of the annular cap 20 of the ring 10. The cap 20 has at least one circumferential groove 30 that extends along the length of the cap 20 and a series of lateral grooves 34 that extend along at least a part of the width of the cap 20. The grooves form a series of blocks. The percentage of the cap surface devoted to grooves is preferably 25 to 10% of the total surface area of the cap, defining a 75 to 90% net-to-gross ratio for the surface of the cap. If the net to gross ratio is greater than 90%, than movement of the lubricant across the surface of the ring 10 during use is limited and there may be insufficient heat dissipation, and if the ratio is less than 75%, then the structural stability of the ring cap 20 may be reduced.

The primary feature of the cap grooving configuration is the centrally located groove 30 that extends the full circumference of the ring 10. The groove is an extra wide groove with sloping, rounded groove walls, see FIG. 2a, as opposed to a straight walled groove such as the side circumferential grooves. The central groove 30 has a width of 10 to 35% of the cap width. The shape of the groove walls permits fluid to easily flow in or out of the groove 30 and traps the fluid in the central groove 30. The central groove 30 divides the cap into two portions. The depth of the central groove 30 should be 10 to 50% of the total depth of the cap portion. The final depth will be dependent upon the material used for the cap 20, the insert ring 10, and possibly the viscosity of any lubricant used inside the tire 16.

Figure 2A:
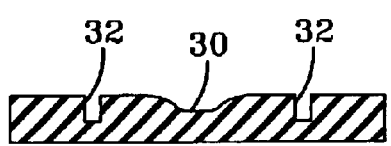
FIGS. 2a and 2b are views along the lines 2a—2a and 2b—2b, respectively, in FIG. 2.

Additional circumferential grooves 32 may be present on either side of the central groove. The outer circumferential grooves 32 are equally spaced from the central groove. The depth of the circumferential grooves 32 may be the same, greater or less than the depth of the central groove 30 and the groove walls are more sharply angled, as seen in FIG. 2a.

Extending outwardly from the central groove 30, in each cap portion, is a series of curved lateral grooves 34. As seen in FIG. 2, the lateral grooves 34 are gradually curved across each cap portion. The lateral grooves 34 in each cap portion are aligned at the central groove 30 and extend to the edge of the cap. The depth of the groove 34 may be constant across the cap portion, but is preferably variable across the cap portion, see FIG. 2b. The greatest depth of the lateral grooves 34 is the same or less than the deepest circumferential groove 30 or 32. For the variable depth grooves, the depth of the groove decreases as the groove 34 approaches the cap edge. By forming the groove 34 with such a varying depth, as the ring 10 rotates within the tire cavity, any lubricating fluid that flows over the cap surface of the ring 10 will flow in the lateral grooves 34 and will flow toward the central groove 30, forcing the fluid to stay in the ring grooves 30, 32, 34. A small amount of fluid will travel out of the lateral grooves 34, but the majority of the fluid will be retained on the cap 20 as desired.

Figure 3:
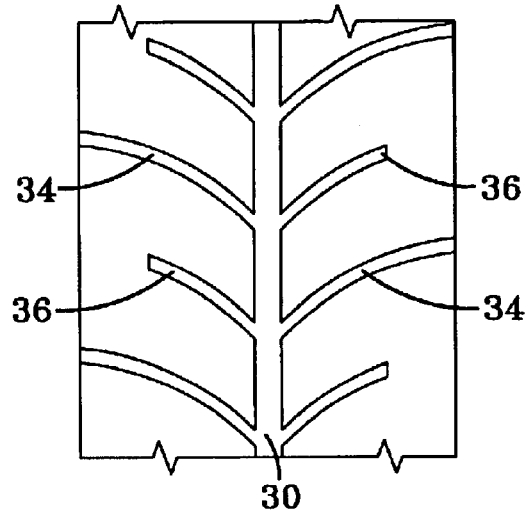
FIGS. 3 to 5 are alternative embodiments of the support ring cap.
Figure 4:
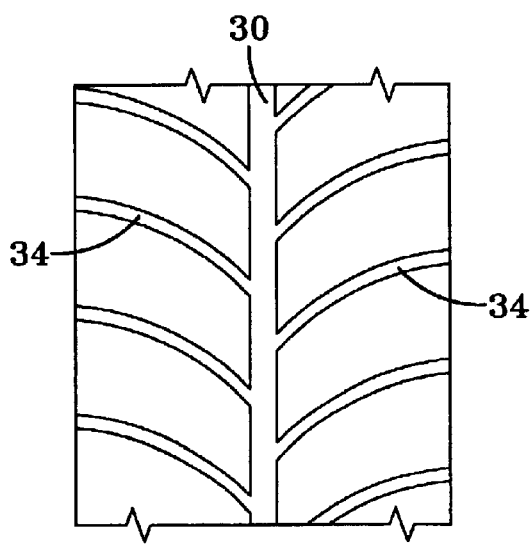
Figure 5:
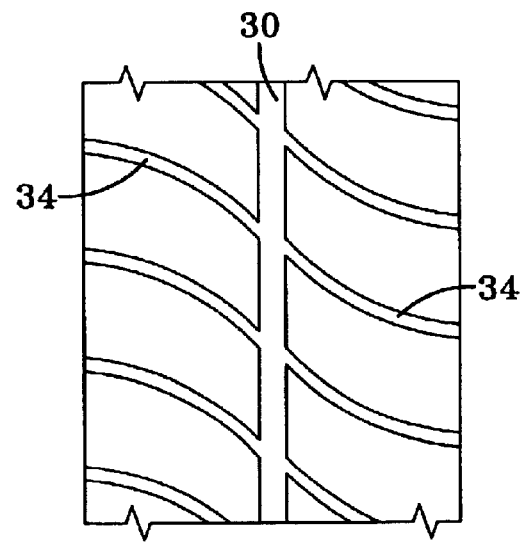

Variations on the configuration of the lateral grooves 34 is permissible, as seen in FIGS. 3–5.

Figure 2B:
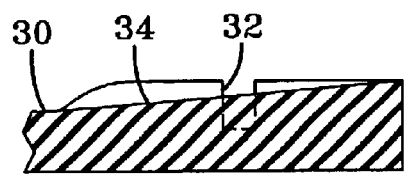

For the cap configuration of FIG. 3, every other lateral groove 36 in each cap portion does not extend to the cap edge. The grooves 34, 36 in each cap portion are aligned at the central groove 30 such that a partial groove 36 is aligned with a full portion width groove 34. The partial grooves 36 may have a constant depth, but preferably have a varying groove depth similar to the grooves 34 as illustrated in FIG. 2b. Alternatively, the partial grooves in each cap portion may be aligned with a partial groove in the adjacent cap portion.

For the cap configuration of FIG. 4, the lateral grooves 34 are not aligned at the central groove 30, but instead are offset from each other relative to the central groove 30.

For the cap configuration of FIG. 5, the lateral grooves 34 in one cap half are inclined in a direction opposing the lateral grooves 34 in the other cap half.

In any of the cap groove configurations of FIGS. 3 to 5, no side circumferentially extending grooves 32 are illustrated. Side circumferentially extending grooves 32 may be provided if desired or needed for heat dissipation and lubricant flow.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that change can be made in the particular embodiments described which will be within the full intended scope of the invention as defined by the following appended claims.

What is claimed is:

1. A support ring intended to be mounted on a wheel rim inside a tire equipping a vehicle, in order to support the tread strip of the tire in the event of an underinflated condition of the tire, the support comprising a base intended to fit around the wheel rim, a cap, and an annular body connecting the base and the cap wherein the cap has at least one circumferential groove and a plurality of lateral grooves resulting in a net-to-gross ratio in the range of 75 to 90%.

2. A support ring in accordance with claim 1 wherein the cap is comprised of a centrally located circumferential groove having sloping rounded walls, the centrally located groove having a width of 15 to 35% of the width of the cap.

3. A support ring in accordance with claim 2 wherein the cap is further comprised of a circumferential groove on each side of the centrally located circumferential groove.

4. A support ring in accordance with claim 1 wherein the lateral grooves decrease in depth as the grooves approach the lateral edge of the cap.

5. A support ring in accordance with claim 1 wherein some of the plurality of lateral grooves extend to the edge of the cap and some of the plurality of lateral grooves do not extend to the edge of the cap.

6. A support ring in accordance with claim 1 wherein the cap has a centrally located circumferential groove dividing the cap into two cap halves, and the plurality of lateral grooves are located in each cap half.

7. A support ring in accordance with claim 6 wherein some of the lateral grooves extend to the edge of the cap and some of the plurality of lateral grooves do not extend to the edge of the cap.

8. A support ring in accordance with claim 6 wherein the lateral grooves in each cap half are curved and are curved in the same direction.

9. A support ring in accordance with claim 6 wherein the lateral grooves in each cap curved in opposing directions.

* * * * *